(12) United States Patent
Spadaccini et al.

(10) Patent No.: US 7,093,437 B2
(45) Date of Patent: Aug. 22, 2006

(54) EXTENDED OPERABILITY AIRCRAFT FUEL DELIVERY SYSTEM

(75) Inventors: Louis J. Spadaccini, Manchester, CT (US); Scott Kaslusky, West Hartford, CT (US); Robert A. McLaughlin, Tequesta, FL (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 10/767,893

(22) Filed: Jan. 29, 2004

(65) Prior Publication Data

US 2005/0166597 A1   Aug. 4, 2005

(51) Int. Cl.
F02C 7/22 (2006.01)
(52) U.S. Cl. ...................................... 60/734
(58) Field of Classification Search ............. 60/39.281, 60/734
See application file for complete search history.

(56) References Cited

U.S. PATENT DOCUMENTS

| | | | |
|---|---|---|---|
| 2,781,831 A * | 2/1957 | Angell | 417/16 |
| 3,751,879 A | 8/1973 | Allington | |
| 4,691,510 A * | 9/1987 | Taylor et al. | 60/734 |
| 5,504,256 A | 4/1996 | Bond et al. | |
| 5,876,604 A | 3/1999 | Nemser et al. | |
| 5,888,275 A | 3/1999 | Hamasaki et al. | |
| 5,992,920 A | 11/1999 | Bailey et al. | |
| 6,258,154 B1 | 7/2001 | Berndt et al. | |
| 6,290,760 B1 * | 9/2001 | Taivalkoski et al. | 96/195 |
| 6,315,815 B1 | 11/2001 | Spadaccini et al. | |
| 6,647,730 B1 | 11/2003 | Liu | |
| 6,709,492 B1 | 3/2004 | Spadaccini et al. | |
| 6,939,392 B1 * | 9/2005 | Huang et al. | 95/46 |

OTHER PUBLICATIONS

Hill et al. Mechanics And Thermodynamics Of Propulsion. Addison-Wesley, 1965. p. 147.*

* cited by examiner

Primary Examiner—Louis J. Casaregola
(74) Attorney, Agent, or Firm—Carlson, Gaskey & Olds

(57) ABSTRACT

A fuel delivery system for a gas turbine engine includes a main fuel pump supplying fuel to a fuel-metering device. The operational flow range of the fuel system is dependent on a minimum net positive suction pressure at the main pump inlet required to prevent pump cavitation. A mixture of fuel and dissolved gases increases the minimum net positive suction pressure required to prevent cavitation. A fuel de-aerator including a permeable membrane removes dissolved gases from the fuel to eliminate formation of dissolved gases. The elimination of dissolved gases from within the liquid fuel reduces the required net positive suction pressure, enabling a greater operational flow range.

16 Claims, 3 Drawing Sheets

EXTENDED OPERABILITY AIRCRAFT FUEL DELIVERY SYSTEM

BACKGROUND OF THE INVENTION

This invention generally relates to a fuel delivery system for an aircraft turbine engine, and specifically to a fuel delivery system including a fuel de-aerator for removing dissolved gasses within fuel prior to entering a main fuel pump.

A fuel delivery system for a gas turbine engine typically includes a tank boost pump that pumps fuel from a fuel tank to a two-stage main fuel pump. The main fuel pump typically includes a centrifugal stage and a positive displacement stage. In most applications, the main fuel pump and tank boost pump are driven by an engine drive shaft. The main fuel pump centrifugal stage supplies necessary pressure to the inlet of a positive displacement gear stage. Pressure at the inlet of the gear stage is required to fill the cavities of the gear pump with fuel as the gears rotate. Gears rotate at a constant rotational speed to provide a constant flow of fuel to a fuel-metering device. The fuel-metering device receives flow from the main fuel pump at a constant rate independent of system backpressure. The fuel-metering device controls the flow rate of the fuel that is delivered to the engine. At lower flow rates the excess fuel flow at the fuel-metering device is bypassed back to the gear pump inlet.

The fuel system for the turbine engine is limited by the range of fuel flow rates that are capable of supplying a net positive suction pressure required in the centrifugal stage of the main fuel pump. The net positive suction pressure defines the minimum total pressure required at the pump inlet for the pump to operate without cavitating. Cavitation results when the pressure along the pump vane drops low enough for dissolved gases to form vapor bubbles. The pressure increases as the fluid flows along the pump vane causing the vapor bubbles to collapse. Cavitation in the pump is not desirable because the collapsing vapor bubbles can cause excessive noise and vibration at the main fuel pump. De-aerating the fuel delays the onset of cavitation, thereby increasing the range of fuel flows that can be delivered by a fuel system to a gas turbine engine without altering the design of the fuel pump.

Fuel stored in the fuel storage tank is in direct contact with air and accumulates a quantity of dissolved gases that are mostly oxygen and nitrogen. Static pressure of the fuel is reduced as the fuel flows through the system causing dissolved gases to be released from the fuel forming vapors that flow along with the liquid fuel. Disadvantageously, dissolved gases within the liquid fuel increase the net positive suction pressure required at the main pump inlet.

Accordingly it is desirable to design a fuel delivery system that includes a device for removing gases from fuel prior to entering the main pump inlet to reduce the required net positive suction pressure thereby suppressing cavitation and increase the range of operable fuel flow rates.

SUMMARY OF THE INVENTION

This invention is a fuel delivery system for a gas turbine engine that includes a fuel de-aerator for removing dissolved gases from the fuel prior to entering the inlet of a main fuel pump.

The fuel delivery system of this invention includes a two-stage main fuel pump. The two-stage main fuel pump includes a centrifugal stage and a positive displacement stage. Fuel to the centrifugal stage of the main fuel pump must be supplied at or above a required net positive suction pressure. The net positive suction pressure is supplied to the inlet of the main fuel pump by a tank boost pump.

The fuel within the fuel tank absorbs gases through its contact with air. Dissolved gases release and form a fuel vapor that flows along with the liquid portion of the fuel. A fuel de-aerator is disposed between the tank boost pump and the main pump inlet for removing dissolved gases from the fuel. The fuel de-aerator includes a permeable membrane in contact with the fuel flow. The permeable membrane is supported on a porous backing. A partial pressure differential across the permeable membrane is created to draw dissolved gases from the fuel across the permeable membrane and away from the fuel flow. The gases removed from the fuel are then exhausted from the fuel delivery system. The resulting fuel that is pumped to the main pump inlet includes a substantially reduced amount of dissolved gases. The reduction in dissolved gases increases the range of operation of the fuel system by decreasing the required net positive suction pressure at the main pump inlet.

Accordingly, the fuel system of this invention includes a fuel de-aerator for removing gases from the fuel to eliminate vapor formation and decrease the required net positive suction pressure to provide an increased range of fuel flow rates.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
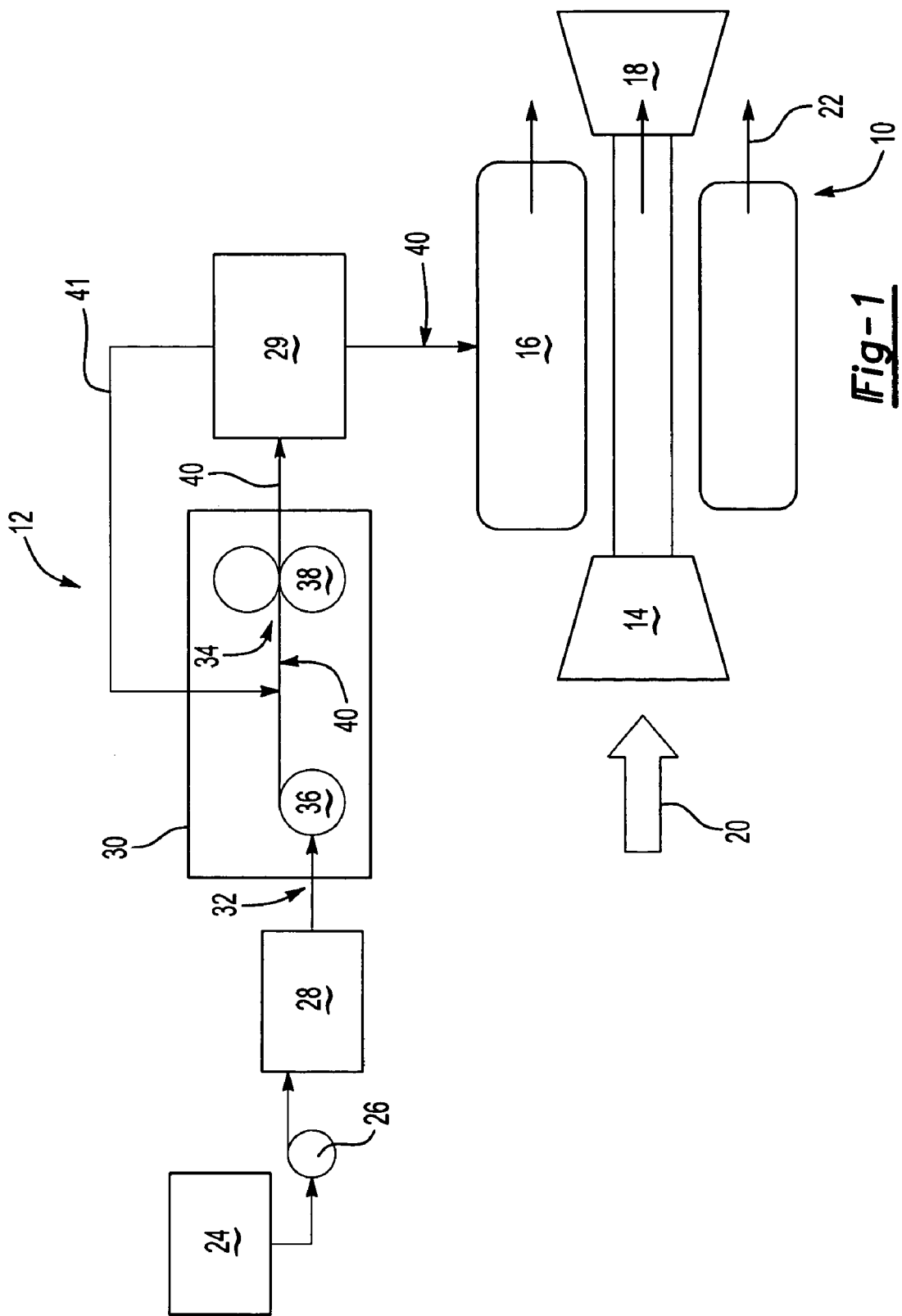
FIG. 1 is a schematic view of a gas turbine engine and fuel delivery system according to this invention.

Referring to FIG. 1, a gas turbine engine assembly 10 is schematically shown and includes a compressor 14, a combustor 16, and a turbine 18. The compressor 14 draws in air 20 and compresses the air to a high pressure. The high-pressure air is mixed with fuel in the combustor 16 and ignited. Hot combustion gases 22 resulting from the ignited fuel drive the turbine 18. A Fuel delivery system 12 supplies fuel 40 to the combustor 16. Removing dissolved gasses within the fuel with a fuel de-aerator 28 optimizes a range of flow rates of fuel from the fuel delivery system 12.

The fuel delivery system 12 includes a fuel-metering unit 29 that receives fuel from a main pump 30. The main pump 30 includes a centrifugal pump 36 that supplies fuel at pressure to an inlet 34 of a gear pump 38. The gear pump 38 supplies fuel at a constant flow rate to the fuel-metering unit 29. Fuel flow 40 from the gear pump 38 remains constant regardless of system 12 backpressure. Excess fuel flow is routed through a bypass passage 41 back to the inlet 34 of the gear pump 38.

The gear pump 38 includes meshing gears that rotate to compress and drive fuel to the fuel-metering unit 29. The centrifugal pump 36 supplies fuel flow to the gear pump 38 to fill cavities between the gears as they rotate. The fuel-metering unit 29 controls fuel flow to the combustor 16 of the turbine engine assembly 10. Performance of the turbine engine assembly 10 is limited by the range of operable flow rates provide by the fuel delivery system 12.

The limiting factor for the flow rates of the fuel delivery system 12 is a net positive suction pressure required at the inlet 34 of the gear pump 38. The net positive suction pressure defines the minimum fuel pressure required for operation of the pump 38 without causing cavitations. Normal operation of the gear pump 38 requires the actual net suction pressure available at the inlet 34 to be greater than a minimum value. A tank boost pump 26 provides a constant fuel pressure to an inlet 32 of the centrifugal pump 36. The constant fuel pressure at the centrifugal pump 36 enables the centrifugal pump 36 to supply fuel at the net positive suction pressure to the inlet 34 of the gear pump 38. Although fuel flow and pressure at the inlet 34 is nearly constant, the flow rates through the main pump 30 vary in response to demands by the in a fuel-metering unit 29. At high flow demands the pressure at the inlets 32, 34 decreases resulting in a reduction in the net positive suction pressure. The fuel flow is limited by this reduction in net positive suction pressure.

The minimum net positive suction pressure is greater for air saturated liquid fuel than for de-aerated liquid fuel. The greater net positive suction pressure requirements are caused by dissolved gases within the fuel. Exposure to air, such as within the fuel tank, allows gasses to dissolve into the fuel. The static pressure drops as fuel flows from an outlet of the fuel tank 24 to the main fuel pump inlet 32. The reduction in static pressure causes vaporization of dissolved gasses and light hydrocarbons. The presence of dissolved gasses with the liquid fuels increases the minimum required net positive suction pressure. The elevated minimum net positive suction pressure limits the range of fuel flow through the fuel delivery system 12.

A fuel de-aerator 28 is disposed within the fuel system 12 between the tank boost pump 26 and the inlet 32 of the centrifugal pump 36. The fuel de-aerator 28 removes dissolved gases from the fuel as the fuel flows from the tank boost pump 26 to the inlet 32 of the centrifugal pump 36. The elimination of dissolved gases within the fuel reduces the amount of fuel vapor that forms as a result of reduced static pressures. The reduction in fuel vapor decreases the minimum net positive suction pressure required to prevent undesirable cavitation in the gear pump 38.

Figure 2:
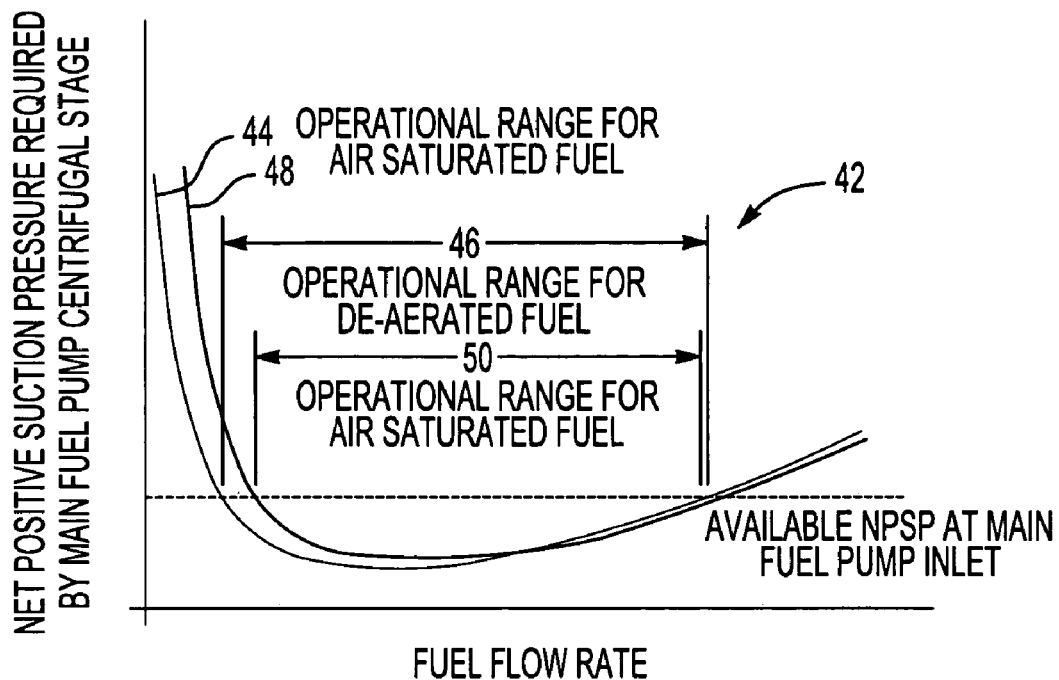
FIG. 2 is a graph representing the relationship between fuel flow and net positive suction pressure for air saturated and de-aerated fuel.

Referring to FIG. 2, graph 42 represents the increased ranges of fuel flow provided by removal of dissolved gases from the fuel. Line 44 indicates the relationship between fuel flow rate and the net positive suction pressure required at the main fuel pump centrifugal stage. As appreciated, the line 44 is in correspondence with an increased range of fuel flows corresponding to removal of dissolved gases from within the fuel. Line 48 corresponds with the operational range for fuel containing dissolved gases. An operational range of fuel flow rates is shown for fuel containing dissolved gases 48, and fuel with a reduced amount of dissolved gases 44. The operational range of fuel flow rate 46 is increased for de-aerated fuels as compared to the operational range of fuel flow rates 50 for air saturated fuels. The resulting increase in the operational range of fuel flow rate provides increased operational capabilities for the engine assembly 10 without requiring a large capacity fuel delivery system 12.

Figure 3:
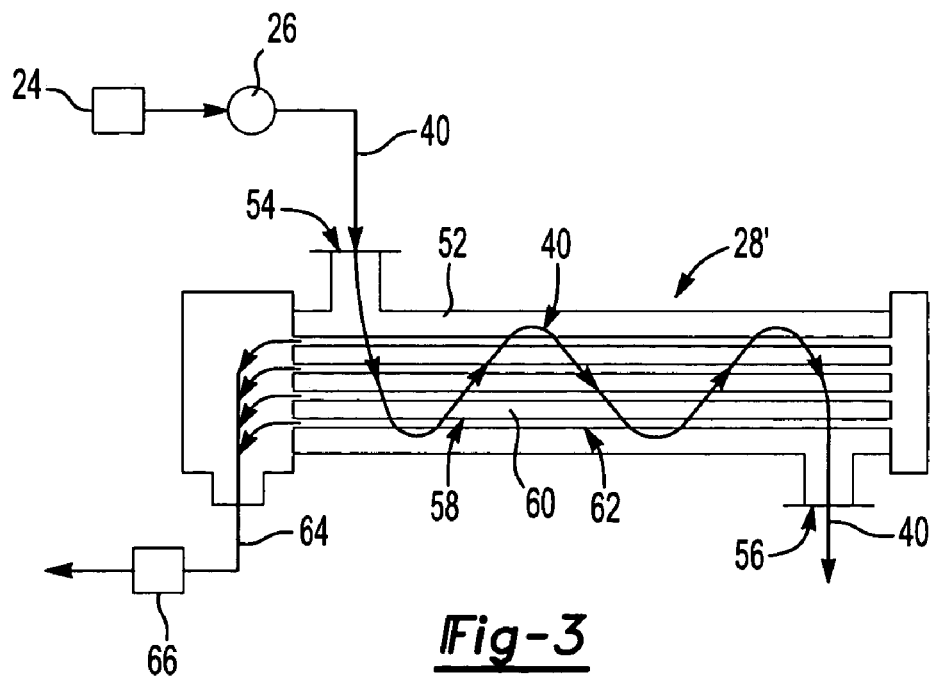
FIG. 3 is a cross-sectional view of a fuel de-aerator according to this invention.

Referring to FIG. 3, a schematic view of a fuel de-aerator 28' according to this invention is shown and includes a plurality of tubes 58 disposed within a housing 52. The fuel 40 is flowed around the tubes 58 from an inlet 54 to an outlet 56. Tubes 58 include a composite permeable membrane 62 that separates oxygen and nitrogen dissolved within the fuel 40. A vacuum pump 66 maintains a vacuum within the tubes 58. The vacuum created within the tubes 58 creates a partial pressure differential across the composite permeable membrane 62 that draws dissolved oxygen and nitrogen from the fuel 40 into the tubes 58 and out with the gas permeate stream 64 through the vacuum pump 66. Oxygen and nitrogen removed from the gas permeate stream 64 is then exhausted from the system. The gas permeate stream 64 can be recycled into the fuel tank 24. De-aerated fuel exits through the outlet 56 and into the inlet 32 of the centrifugal pump 36.

Figure 4:
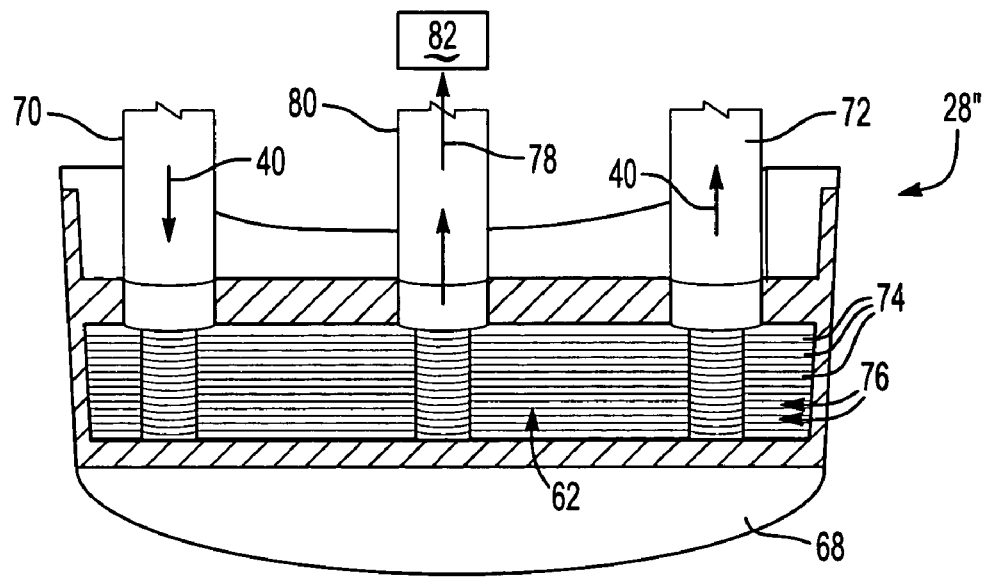
FIG. 4 is a cross-sectional view of another fuel de-aerator according to this invention.

Referring to FIG. 4, another embodiment of a fuel de-aerator 28" is shown and includes a series of fuel plates 74 stacked one on top of the other. The composite permeable membrane 62 is included on each of the fuel plates 74 to define a portion of fuel passages 76. Fuel enters through an inlet 70 and exists through an outlet 72. An opening 80 is open to a vacuum source 82. Fuel 40 passes within the fuel passages 76 defined by the stacked fuel plates 74. The fuel plates 74 are disposed within the housing 68 that defines the inlet 70 and the outlet 72. The use of the fuel plates 74 allows for the adaptation of the fuel de-aerator 28" to various applications by the addition or subtraction of fuel plates 74. Although embodiments of fuel de-aerators are shown and described, a worker skilled in the art with the benefit of this application would understand that other configurations of fuel de-aerators are within the contemplation of this invention.

Figure 5:
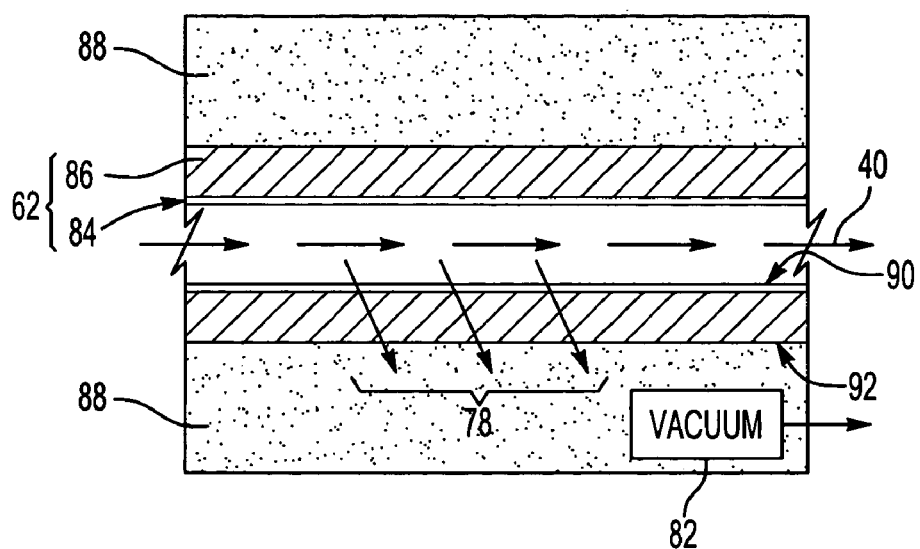
FIG. 5 is a cross-section of a permeable membrane according to this invention.

Referring to FIG. 5, the composite permeable membrane 62 is shown in cross-section and preferably includes a permeable layer 84 disposed over a porous backing 86. The porous backing 86 supplies the required support structure for the permeable layer 84 while still allowing maximum oxygen diffusion from fuel. The permeable layer 84 is coated on to the porous backing 84 and a mechanical bond between the two is formed. The permeable layer 84 is preferably a 0.5–20 µm thick coating of Teflon AF 2400 over a 0.005in thick porous backing 86 of polyvinylidene fluoride (PVDF) with a 0.25 µm pores size. Other supports of different material, thickness and pore size can be used that provide the requisite strength and openness. Preferably the permeable layer 84 is Dupont Telfon AF amorphous fluoropolymer however other materials known to workers skilled in the art are within the contemplation of this invention, such as Solva Hyflon AD perfluorinated glassy polymer and Asahi Glass CYTOP polyperfluorobutenyl vinyl ether. Each composite permeable membrane 62 is supported on a porous substrate 88. The porous substrate 88 is in communication with the vacuum source 82 to create an oxygen partial pressure differential across the composite permeable membrane 62.

In operation a partial pressure differential is created by the vacuum source 82 between a non-fuel side 92 of the permeable membrane 62 and a fuel side 90. Oxygen, nitrogen and other dissolved gasses indicated at arrows 78 diffuse from fuel 40 across the composite permeable membrane 62 and into the porous substrate 88. From the porous substrate 88 the oxygen, nitrogen and other dissolved gasses 78 are pulled and vented out of the fuel system 12.

Fuel system 12 of this invention provides for the removal of dissolved gases within the fuel to reduce the minimum required net positive suction pressure. The reduction of the net positive suction pressure required improves the operational range of the fuel delivery system 12 above the capacity if liquid and dissolved gases were both present. Reduction in the net positive suction pressure improves the operational fuel flow range of the fuel delivery system 12 without increasing the overall size of the fuel delivery system 12.

The foregoing description is exemplary and not just a material specification. The invention has been described in an illustrative manner, and should be understood that the terminology used is intended to be in the nature of words of description rather than of limitation. Many modifications and variations of the present invention are possible in light of the above teachings. The preferred embodiments of this invention have been disclosed, however, one of ordinary skill in the art would recognize that certain modifications are within the scope of this invention. It is understood that within the scope of the appended claims, the invention may be practiced otherwise than as specifically described. For that reason the following claims should be studied to determine the true scope and content of this invention.

What is claimed is:

1. An aircraft fuel system comprising:
   a main fuel pump for pumping fuel to a fuel metering device; and
   a fuel de-aerator for removing dissolved gases from the fuel before entering said main fuel pump, wherein said fuel de-aerator comprises a membrane filter permeable to gases dissolved within said fuel.

2. The system of claim 1, wherein removal of said dissolved gases within said fuel reduces a net positive suction pressure required at an inlet of said main fuel pump.

3. The system of claim 1, comprising a boost pump for supplying the main fuel pump with fuel at a desired pressure.

4. The system of claim 3, wherein said boost pump supplies a net positive suction pressure at an inlet of said main fuel pump.

5. The system of claim 3, wherein said fuel de-aerator is disposed between said boost pump and said main fuel pump.

6. The system of claim 1, wherein said membrane filter is supported on a porous substrate.

7. The system of claim 6, comprising a partial pressure differential between a fuel side of said membrane filter and a non-fuel side of said membrane filter, wherein gases diffuse from fuel through said membrane filter to said non-fuel side.

8. The system of claim 7, wherein said diffused gases on said non-fuel side are vented overboard.

9. The system of claim 6, further comprising a fuel plate defining fuel passages within a housing between an inlet and an outlet.

10. An aircraft fuel system comprising:
    a main fuel pump for pumping fuel to a fuel metering device; and
    a fuel de-aerator for removing dissolved gases from the fuel before entering said main fuel pump, wherein said fuel de-aerator comprises a tubular membrane.

11. The system of claim 1, wherein a rate of fuel flow capacity of said system is related to said net positive suction pressure.

12. The system of claim 11, wherein said rate of fuel flow capacity increases responsive to removal of gases from said fuel.

13. A gas turbine engine assembly comprising:
    a compressor to compress intake air;
    a combustor to combust fuel with compressed intake air;
    a turbine section comprising a rotating turbine in flow communication with said combustor; and
    a fuel delivery system comprising a main fuel pump for pumping fuel to a fuel metering device, and a fuel de-aerator for removing dissolved gases from the fuel before entering said main fuel pump, wherein said fuel de-aerator comprises a membrane filter permeable to gases dissolved within said fuel.

14. The assembly of claim 13, comprising a boost pump for supplying the main fuel pump with fuel at a said net positive suction pressure.

15. The assembly of claim 14, wherein said fuel de-aerator is disposed between said boost pump and said main fuel pump.

16. The assembly of claim 13, comprising a partial pressure differential between a fuel side of said membrane filter and a non-fuel side of said membrane filter, wherein gases diffuse from said fuel side through said membrane filter to said non-fuel side.

* * * * *